United States Patent
Long

(10) Patent No.: US 8,224,055 B2
(45) Date of Patent: Jul. 17, 2012

(54) CALIBRATION OF VOLUME ACQUIRED IMAGES

(75) Inventor: Andrew Long, Leatherhead (GB)

(73) Assignee: Elekta AB (publ), Stockholm (SE)

( * ) Notice: Subject to any disclaimer, the term of this patent is extended or adjusted under 35 U.S.C. 154(b) by 360 days.

(21) Appl. No.: 12/517,839

(22) PCT Filed: Dec. 8, 2006

(86) PCT No.: PCT/EP2006/011829
§ 371 (c)(1),
(2), (4) Date: Jun. 5, 2009

(87) PCT Pub. No.: WO2008/067838
PCT Pub. Date: Jun. 12, 2008

(65) Prior Publication Data
US 2010/0322491 A1  Dec. 23, 2010

(51) Int. Cl.
*G06K 9/00* (2006.01)
(52) U.S. Cl. ........................................ 382/131
(58) Field of Classification Search ............. None
See application file for complete search history.

(56) References Cited

U.S. PATENT DOCUMENTS

| | | | |
|---|---|---|---|
| 7,463,296 B2 * | 12/2008 | Sun et al. | 348/254 |
| 7,609,884 B1 * | 10/2009 | Stalling et al. | 382/168 |
| 2005/0013471 A1 | 1/2005 | Snoeren et al. | |

OTHER PUBLICATIONS

De Bethune et al, "Adaptative intensity matching filters: a new tool for multi-resolution data fusion", Agard Spp. Symposium on Multisensor Systems and Data Fusion for Telecommunications, Remote Sensing and Radar, 1997, pp. 1-13.
Gonzalez et al., "Digital image processing, Second Edition, Passage "Histogram Processing"" Digital Image Processing, Prentice Hall, 2002, pp. 88-108.
Pratt, "Digital image processing, Passage—Ed. 3" Digital Image Processing: PIKS Inside, New Your: John Wiley & Sons, US, 2001, pp. 258-261.
Lloyd et al., "Histogram painting for better photomosaics" Processing Computer Graphics and Imaging, 2002, pp. 1-6.
PCT International Search Report, Aug. 8, 2007.
PCT Written Opinion of the International Searching Authority, 2005.

\* cited by examiner

*Primary Examiner* — Tu Nguyen
(74) *Attorney, Agent, or Firm* — Westman, Champlin & Kelly, P.A.; Z. Peter Sawicki

(57) ABSTRACT

A reference image is used to calibrate a subsequent image, such as one obtained during therapy. A number of local histograms are prepared for each image, a transformation is identified that transforms the histograms to be substantially the same and is applied to voxels in the subsequent image. Changes between the reference and subsequent images such as the movement of internal structures will be preserved since the method compares local histograms and this corrects intensities, not shapes. Gently varying artifacts such as the cup artifact will be substantially eliminated. The volume image thus derived can then be used for treatment planning.

14 Claims, 2 Drawing Sheets

CALIBRATION OF VOLUME ACQUIRED IMAGES

CROSS-REFERENCE TO RELATED APPLICATION

This Application is a Section 371 National Stage Application of International Application No. PCT/EP2006/011829, filed Dec. 8, 2006 and published as WO 2008/067838 A1 on Jun. 12, 2008, the content of which is hereby incorporated by reference in its entirety.

FIELD OF THE INVENTION

The present invention relates to the calibration of volume acquired images.

BACKGROUND OF THE INVENTION

In the treatment of tumours and other disorders by radiotherapy, a beam of high energy radiation is directed towards the target area and causes tissue damage to the tissue therein to weaken the tumour, and eventually, destroy it. In order to prevent collateral damage to healthy tissue surrounding the tumour, the beam is typically shaped so as to reduce areas of overlap and is directed towards the target area from a number of different directions, all centred on the target area. In the past, this was often by way of ceasing the treatment, repositioning the source and/or the patient, and then continuing. Modern radiotherapeutic apparatus however allows for the source to be continuously rotated around the patient and to be shaped by so-called multi-leaf collimators to a desired external shape, which may change with time. The rotation angles, speeds and beam shapes are calculated in advance so as to deliver a three-dimensional dose distribution to the patient which is maximised in the area of the tumour and minimised outside the tumour, particularly so in sensitive areas of the patient.

This type of treatment requires careful control of the position of the patient so that it can be correlated correctly with the dose distribution that will be delivered. Accordingly, such radiotherapeutic apparatus is commonly provided in combination with a diagnostic x-ray source and an associated detector. This diagnostic source may be integrated in the therapeutic head, or it may be spaced around the rotating gantry by (for example) 90 degrees. This allows an investigative rotation to be made with the diagnostic source in order to verify that the patient is in a correct position.

Constraints such as the permissible speed of rotation of the therapeutic source mean that, which a patient in place and awaiting treatment, there is typically only time for only one or two diagnostic rotations. Accordingly, techniques such as cone beam CT reconstruction are used to prepare a three-dimensional volume image of the patient in position prior to treatment. These use a three-dimensional (cone) shaped beam which emanates from the diagnostic source and provides a series of two-dimensional images of the patient from different directions as it is rotated. These are combined using known algorithms so as to produce a three-dimensional volume image.

Such an image is typically not suitable for the treatment planning stage. The volume images for this purpose are prepared on an investigative CT apparatus which uses a two-dimensional fan beam detected by a one-dimensional detector. This fan beam is rotated very quickly around the patient, and the apparatus and/or the patient is indexed longitudinally so that a series of parallel slices are obtained. Each slice is a two-dimensional section through the patient derived from the plurality of one-dimensional images. A three-dimensional volume image of the patient is derived by stacking the adjacent slices. Such an image is generally of a very high quality since scattering artefacts are minimised by the use of a one-dimensional detector and a two-dimensional beam. Further, the individual pixel values are carefully calibrated to a scale known as the Hounsfield scale. According to this scale, an electron density corresponding to water is given the value zero, an electron density corresponding to air is given the value of minus 1000, and all other electron densities are mapped to a straight line relationship governed by these two points.

As a result of scattering within the three dimensional cone beam (and other difficulties) a cone beam CT image includes artefacts such as the well-known "cup" artefact, in which the apparent densities towards the middle of the image are depressed. As a result, the individual pixel values are not generally calibrated to the Hounsfield scale. Nevertheless, such cone beam CT images are of sufficient quality to discern structures within the patient which can be compared with previously obtained investigative images either to confirm that the patient is in the correct position or to derive a vector indicating the positional error in the relevant six degrees of freedom (three translational directions and three rotational directions). This image can then be passed back to the apparatus and used, for example, to adjust the patient position via a motorised patient couch. The treatment can then be delivered with confidence as to its positional accuracy.

If the diagnostic images obtained during treatment were of a suitable quality, they could be used for treatment planning. This would allow adaptive treatment planning to be realised, in other words to investigate the state of the patient at the time of treatment and observe changes within the patient such as movement of the tumour, growth or reduction of the tumour, or the like. In tumours set within relatively mobile areas of the patient such as the abdomen or the lungs, it is possible for the tumour to move and adopt a different position relative to sensitive structures of the patient. This could justify re-running the treatment planning programmes, and the ability to do so would allow the dose distribution to be adapted to the more recent state of the patient. At present, a diagnostic image taken immediately before treatment could be used to revalidate or correct the treatment plan overnight, prior to a subsequent treatment, but with the development of improved computing power over time, this could potentially be done immediately before each and every treatment.

Recent work has therefore been devoted to improving the quality of cone beam CT imaging so that the pixel values can be reliably calibrated in Hounsfield units (and therefore made acceptable to standard treatment planning systems), and in the elimination of artefacts through the improvement of the detectors and the reduction, where possible, of scattering within the cone beam.

SUMMARY OF THE INVENTION

The present invention seeks to approach the problem in a different manner. In short, the diagnostic image (i.e. the image acquired by the diagnostic source of the imaging apparatus such as immediately before a treatment) is not the only information that is available as to the internal structure of the patient. The previously acquired investigative CT image, i.e. the high quality image used for treatment planning (which we will refer to henceforth as a "reference image") is also available. Given that the reference image detects the same patient and should be relatively recent, typically a matter of days or weeks previously, the current (ex-hypothesi unknown) internal structure of the patient will be generally similar to that depicted in the reference image. There will of course be small differences, which is the reason why a new reference image is desired, but these differences are unlikely to be dramatic. Accordingly, the present invention proposes that the reference image be used as a calibration source for the diagnostic image.

Accordingly, the present invention provides a method of preparing a volume image of a patient, comprising the steps of acquiring a reference image of the patient suitable for treatment planning purposes, acquiring a subsequent image of the patient, selecting a plurality of voxels in one of the subsequent image and the reference image, and preparing a histogram of the voxel values in a region around each selected voxel, to form a first set of histograms, identifying the corresponding regions in the other image and preparing a histogram of the voxel values in each of those corresponding regions, to form a second set of histograms, for each histogram in the first set, identifying a transformation that transforms it to be substantially the same as the corresponding histogram of the second set, thereby to derive a set of transformations, and applying a transformation to voxels in the subsequent image based on the set of transformations.

In this way, an image can be obtained from a cone beam CT apparatus and corrected using the voxel intensities from a recent reference image as a norm. Provided that the reference image is relatively recent, there should not be sufficient gross changes in the volume image to affect this process. Changes between the reference and subsequent images such as the movement of internal structures will be preserved since the method compares local histograms and this corrects intensities, not shapes. Likewise, the use of histograms around a local region of the volume image will mean that gently varying artefacts such as the cup artefact will be substantially eliminated.

The reference image and the subsequent image are preferably compared for differences in patient position as between the two images. This will ensure that the corresponding regions of the two images depict the same structures of the patient, and offers a more relevant comparison. The corresponding regions are preferably determined using this translation as between the two images. This translation is preferably determined in six degrees of freedom, i.e. including rotation.

The selected voxels of the image can be a subset of the complete image, or can be all the voxels of the image. In the latter case, the eventual transformations will be individual to each voxel but at the expense of a greatly increased processing burden.

The region around each selected voxel can be substantially cuboid, substantially spherical, or any suitable shape. The aim is to collect a group of voxels around the selected voxel so as to produce a meaningfully populated histogram so that a reasonably accurate transformation can be derived.

The set of transformations that is eventually arrived at ideally contains a transformation for each voxel. This allows a straightforward calculation of the final image by applying the transformation set to the subsequent image by applying each transformation in the set to each voxel of the image. This set of transformations can be populated with the identified transformations and, for voxels lying between the selected voxels, transformations that are an interpolation between surrounding identified transformations. This avoids the computational load associated with selecting every voxel; as most of the artefacts impose an error that varies smoothly across the image, this approach has merit.

The transformations are preferably polynomial in form, more preferably a second order polynomial of the form $y=a+bx+cx^2$ where x is the voxel value of the subsequent image and y is the voxel value of the reference image.

The volume image thus derived can then be used for treatment planning, such as in radiotherapy.

BRIEF DESCRIPTION OF THE DRAWINGS

An embodiment of the present invention will now be described by way of example, with reference to the accompanying figures in which.

DETAILED DESCRIPTION OF ILLUSTRATIVE EMBODIMENTS

Figure 1:
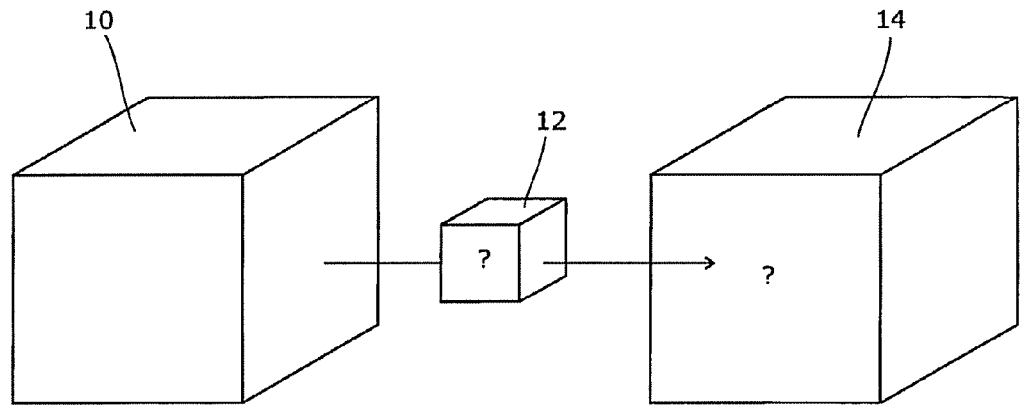
FIG. 1 shows the subsequent volume image and the unknown accurate image.

FIG. 1 illustrates the problem addressed by the present invention. A volume image 10 has been taken via a cone beam CT arrangement, or similar, and has the advantage of being recent but has the disadvantage of being of insufficient quality for treatment planning purposes. Specifically, the voxel values have not been calibrated to the Hounsfield scale and cannot be calibrated directly since the image is likely to contain artefacts such as the cup artefact common in cone beam images. The problem therefore is to find some transformation 12 which can be applied mathematically to image 10 and which will result in an idealised volume image 14. Of course, neither the transformation 12 nor the ideal image 14 are known.

Figure 2:
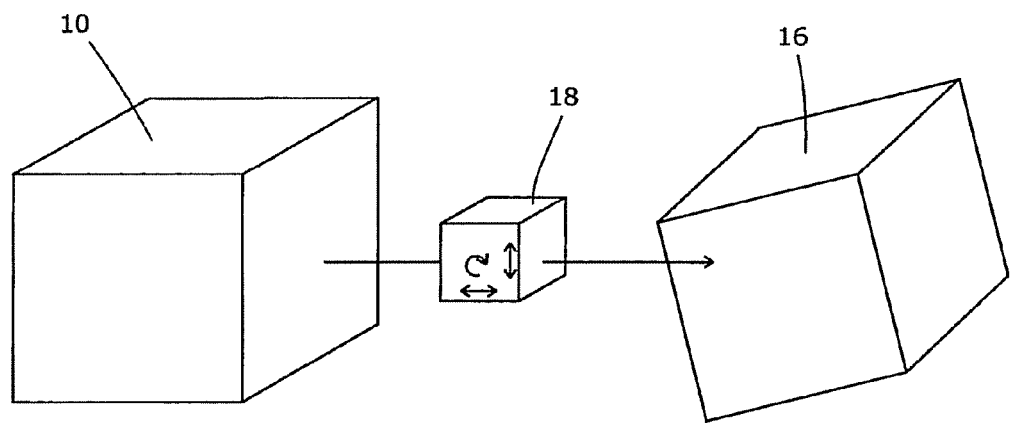
FIG. 2 shows the subsequent volume image and the related reference image.

What we do have available is an earlier image, which we shall refer to as a "reference" image 16, which has been prepared using diagnostic imaging apparatus, is free of artefacts, etc, and has been calibrated to the Hounsfield scale. This image is of essentially similar subject matter, being the same patient at a slightly earlier date or time. It must of course be assumed that there are some differences between the content of two images 10, 16, else the reference image 16 could be used directly. However, the changes are unlikely to be dramatic. One difference that is likely to exist between the two images is the precise positioning of the patient in the available 6 degrees of freedom (3 degrees of translational freedom and 3 degrees of rotational freedom). However, as shown in FIG. 2, there is likely to be a straightforward transformation 18 between the subsequent image 10 and the reference image 16, and algorithms exist to identify this transformation 18.

This problem has been faced repeatedly before, for example in the context of ensuring that a patient lying on the patient support in the radiotherapy apparatus is in the same position as when the same patient received the previous treatment. To ascertain this, a cone beam CT image is prepared shortly before or during therapy, and is compared with a previous such image to identify any translation or rotation. Algorithms therefore exist to identify the 6 dimensional vector, with the intention of ascertaining whether the total difference in patient position exceeds preset limitations. These algorithms exist by spotting patterns within the image and comparing these to similar patterns in an iterative manner so as to determine the total translation.

Figure 4:
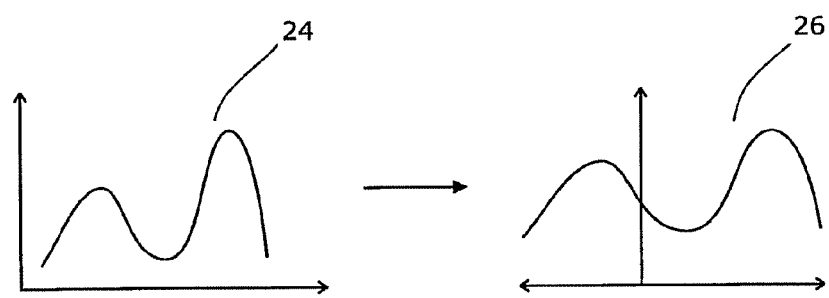
FIG. 4 shows the comparison of histograms.

Next, a plurality of subregions 20 within the subsequent image 10 are identified, and the positional transformation 18 is used to identify the corresponding sub-regions 22 within the reference image 16. Thus, we are now able to compare a specific sub section of the patient as viewed in the subsequent image 10 and the reference image 16. In dealing with a small part of the image, it is correspondingly less likely that there will be significant changes in the nature of the tissue, although its specific position may have changed slightly. Further, artefacts such as the cup artefact have an effect which varies at different paces of the image, but which varies smoothly. Thus, by choosing a small section of the image such a one thousand-voxel subregion, it is likely that the effect of such artefacts will be largely uniform across an entire subregion. Thus, a histogram of the voxel values within the sub region 20 is prepared, and likewise for the subregion 22 of the reference image 16. This histogram will of course not include any positional information, and therefore slight changes in the size and location of the patient and the tumour etc will not affect this. Then, the histogram 24 (FIG. 4) derived from the subregion 20 thereof, is compared with the histogram 26 derived from the corresponding subregion of the reference image 16. These will of course have different linear scales since the reference image 16 is calibrated to the Hounsfield scale, but the overall shape should be largely similar. We can therefore derive a transformation which is best able to convert the histogram 24 in to the histogram 26. We expect that a second order polynomial transformation will be appropriate in that it will provide adequate accuracy without imposing an excessive computational load, but first order, third order or other transformations may be selected.

Having ascertained the parameters for a transformation as between histograms 24 and 26, these are stored in a transformation matrix at a location corresponding to the centre of the sub-region 20. A further sub-region 28 is then selected and the process is repeated.

Figure 3:
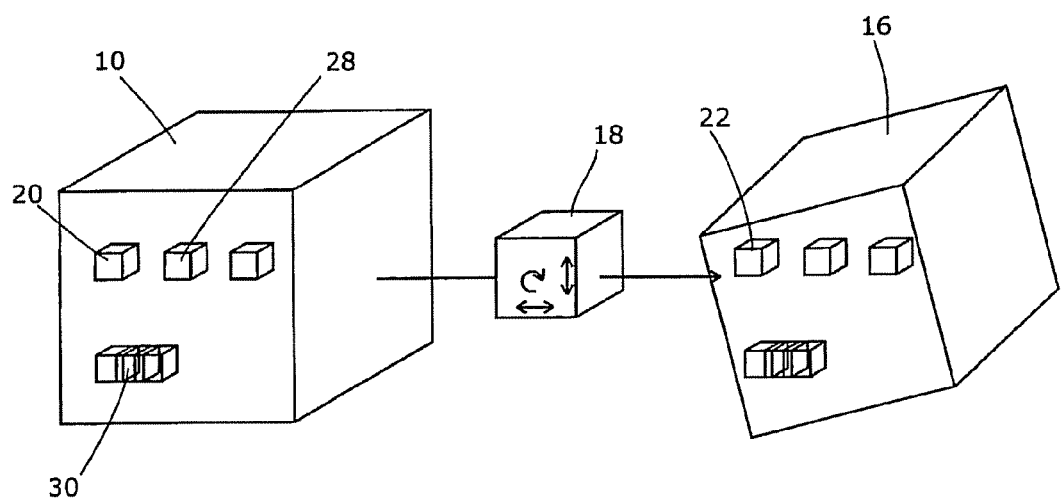
FIG. 3 shows the comparison between the subsequent volume image and an ideal reference image.

This is continued for a large number of sub-regions within the subsequent image 10. These sub-regions may overlap as shown at 30 (FIG. 3), or they may be distinct. They should be spread liberally around the new image 10, either randomly around the image, in a suitable grid pattern, or otherwise. The sub-regions 20, 28 (etc) are shown in FIG. 3 as being cuboid in shape, but they may be other shapes such as spherical. Equally, it is possible to choose sub-regions within the reference image 16.

This yields a transformation matrix which has a set of parameters for a histogram transformation at locations corresponding to each of the sub-regions previously selected. Unless a sub-region was chosen around each and every voxel of the subsequent image 10, it then only remains to fill in parameters for each other point in the transformation matrix so that a set of transformation parameters is available for each and every voxel of the subsequent image 10. This filling in process can either be done via a suitable interpolation function between the calculated parameters, or otherwise. The interpolation could be linear, polynomial or other such interpolation.

This yields a matrix of parameters giving a calculation which will correct a voxel value in the subsequent volume image 10 to a voxel value calibrated to the Hounsfield scale. The transformation does of course vary across the subsequent image 10, a variation which will reflect the effect of artefacts in the cone beam CT image. This transformation matrix can then be applied to the subsequent image 10 to produce the unknown idealised image 14 of FIG. 1, or at least a sufficiently close approximation thereto. This resultant image can then be used for treatment planning.

In this way, the treatment can be re-planned prior to, during or after treatment so as to take account of charges to the patient, including those resulting from the treatments itself. Given the computing power available at present, it is likely that the optimum approach will be to process the subsequent image and re-plan the treatment overnight prior to the next treatment.

It will of course be understood that many variations may be made to the above-described embodiment without departing from the scope of the present invention.

Although the present invention has been described with reference to preferred embodiments, workers skilled in the art will recognize that changes may be made in form and detail without departing from the spirit and scope of the invention.

The invention claimed is:

1. A method of preparing a volume image of a patient, comprising the steps of;
   (a) acquiring a reference image of the patient suitable for treatment planning purposes;
   (b) acquiring a subsequent image of the patient;
   (c) selecting a plurality of voxels in one of the subsequent image and the reference image, and preparing a histogram of the voxel values in a region around each selected voxel, to form a first set of histograms;
   (d) identifying the corresponding regions in the other image and preparing a histogram of the voxel values in each of those corresponding regions, to form a second set of histograms;
   (e) for each histogram in the first set, identifying a transformation that transforms it to be substantially the same as the corresponding histogram of the second set, thereby to derive a set of transformations; and
   (f) applying a transformation to voxels in the subsequent image based on the set of transformations, thereby to render the subsequent image suitable for treatment planning purposes.

2. The method according to claim 1 in which the reference image and the subsequent image are compared for differences in patient position as between the two images.

3. The method according to claim 2 in which the corresponding regions are determined based upon the translation of the patient as between the two images.

4. The method according to claim 3 in which the translation is determined in six degrees of freedom.

5. The method according to claim 1 in which a subset of the voxels are selected.

6. The method according to claim 1 in which all the voxels are selected.

7. The method according to claim 1 in which the region around each selected voxel is substantially cuboid.

8. The method according to claim 1 in which the region around each selected voxel is substantially spherical.

9. The method according to claim 1 in which the set of transformations contains a transformation for each voxel, and the transformation set is applied to the subsequent image by applying each transformation in the set to each voxel of the image.

10. The method according to claim 1 in which the set of transformations is populated with; (a) the identified transformations and, (b) for voxels lying between the selected voxels, transformations that are an interpolation between surrounding identified transformations.

11. The method according to claim 1 in which the transformations are polynomial.

12. The method according to claim 11 in which the transformations are a second order polynomial of the form $y=a+bx+cx^2$ where x is the voxel value of the subsequent image and y is the voxel value of the reference image.

13. The method according to claim 1 in which the volume image is subsequently used for treatment planning.

14. The method according to claim 1 in which the volume image is subsequently used for radiotherapy treatment planning.

* * * * *